Nov. 10, 1959     R. T. LOWE ET AL     2,912,212
RESILIENT SUPPORT
Filed May 11, 1956     3 Sheets-Sheet 1
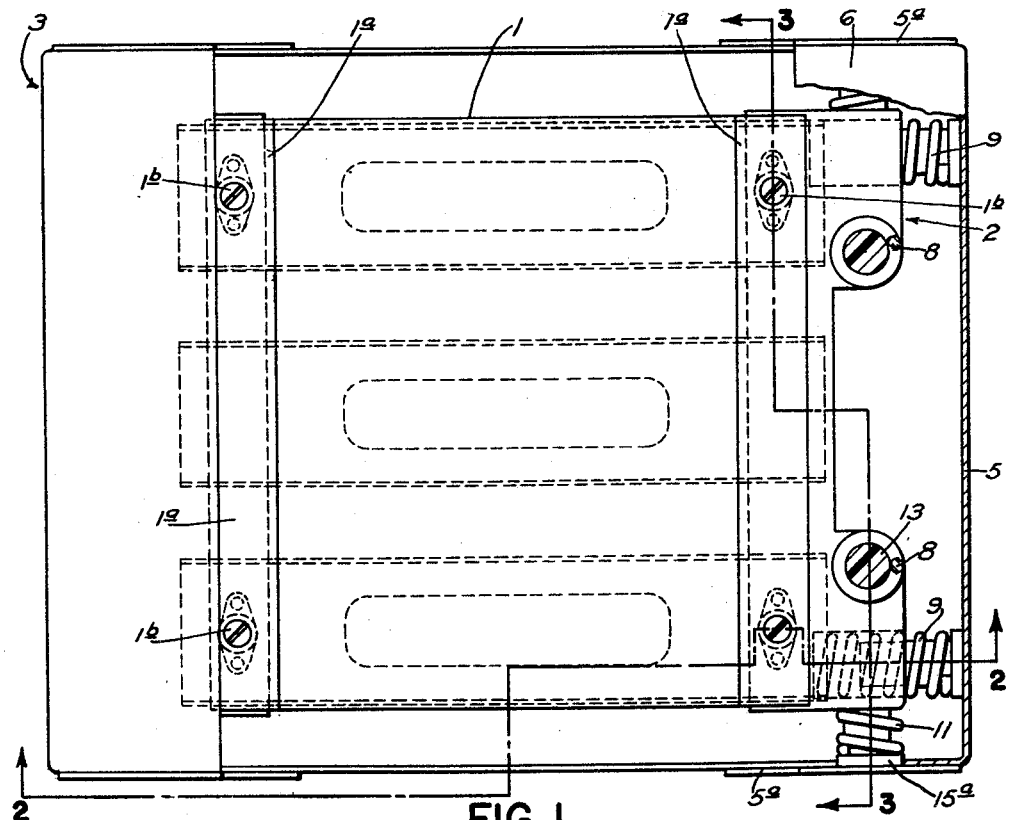
FIG. I
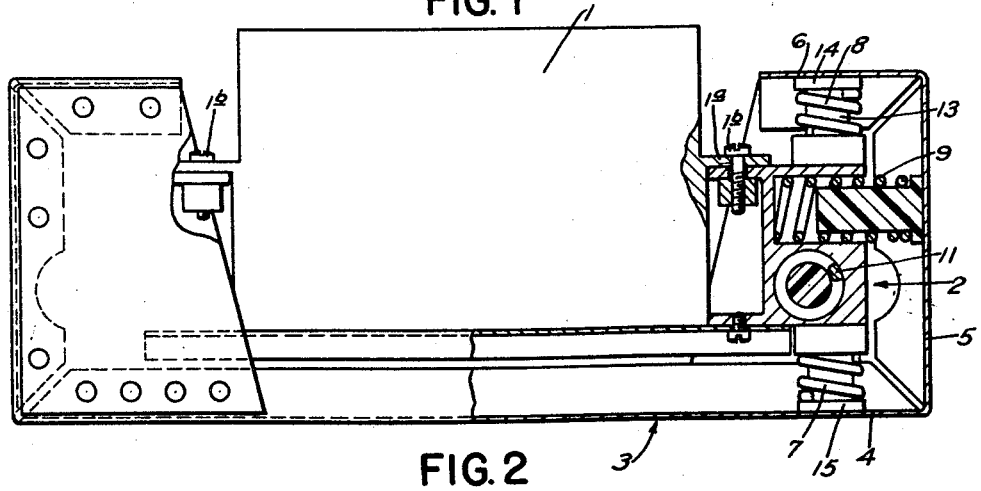
FIG. 2
INVENTORS.
RUSSELL T. LOWE
RICHARD D. CAVANAUGH
BY
*Dike, Thompson & Sanborn*
ATTORNEYS Nov. 10, 1959  R. T. LOWE ET AL  2,912,212
RESILIENT SUPPORT
Filed May 11, 1956  3 Sheets-Sheet 2
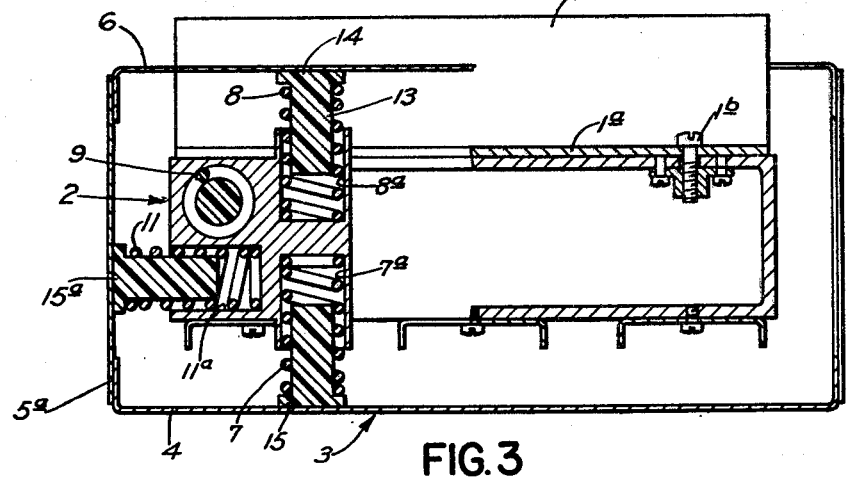
FIG. 3
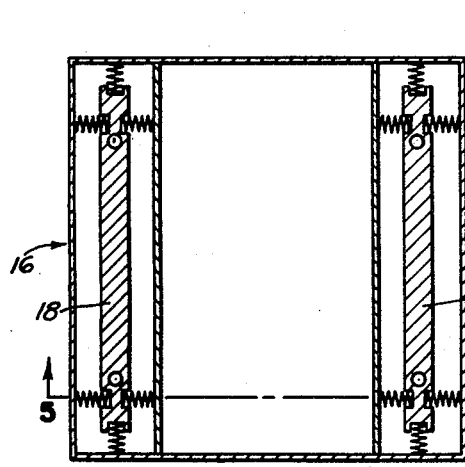
FIG. 4
FIG. 5
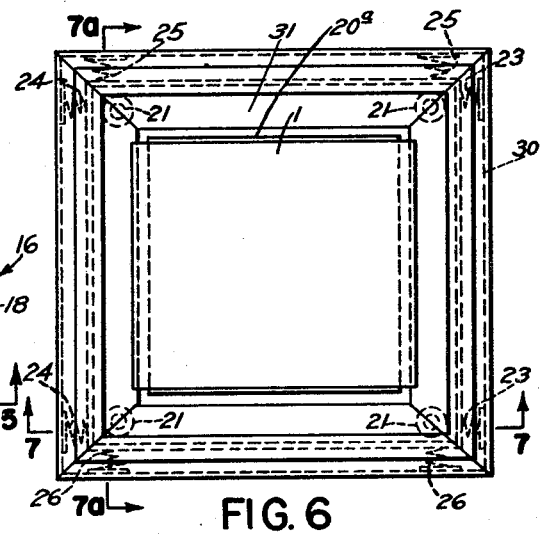
FIG. 6
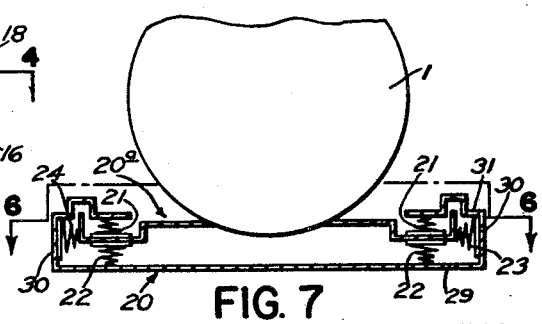
FIG. 7
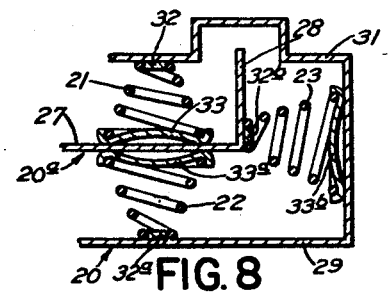
FIG. 8
INVENTORS.
RUSSELL T. LOWE
RICHARD D. CAVANAUGH
BY
Dike, Thompson & Sanborn
ATTORNEYS INVENTORS
RUSSELL T. LOWE
RICHARD D. CAVANAUGH
BY
Dike, Thompson & Sanborn
ATTORNEYS United States Patent Office 2,912,212
Patented Nov. 10, 1959

2,912,212

RESILIENT SUPPORT

Russell T. Lowe, Dedham, and Richard D. Cavanaugh, Watertown, Mass., assignors to Barry Controls Incorporated, Watertown, Mass., a corporation of Massachusetts Application May 11, 1956, Serial No. 584,360

7 Claims. (Cl. 248—358)

This invention relates to resilient supports and, more particularly, to vibration isolators. A vibration isolator is a device to reduce the magnitude of vibration as it is transmitted from one structure to another. The vibration whose magnitude is reduced may be either a vibratory motion or a vibratory force. Vibration isolators are commonly used to support engines, pumps, and other apparatus to prevent the transmission of force from such equipment to the structure which supports it. Vibration isolators are also used to mount delicate equipment in aircraft, vehicles, ships, industrial plants and the like to protect such equipment from the vibratory motion existing where the equipment is used.

The principal elements of a vibration isolator are resilient means for supporting the load, and damping means for dissipating energy to prevent the vibration amplitude from becoming excessively great. It is difficult to combine both of these functions in a single mechanical element because the resilient means must be designed to return the energy which it receives whereas the damping means is inherently an energy dissipating device. In certain types of vibration isolators, it is convenient to employ a coil spring for supporting the load. The stiffness of such a spring may be carefully controlled and predetermined to accomplish the desired function. Such a spring generally is undamped, and a separate energy dissipating means or damper must be used in conjunction with the coil spring to attain optimum characteristics for the vibration isolator.

One object of this invention is to construct the spring and damper from materials which are substantially unaffected by extremes of temperature and other environmental conditions. Isolators are frequently used in military aircraft and in other locations wherein extreme temperatures exist, and it is desirable that the operation of the isolators be independent of environmental conditions insofar as possible.

Another object of this invention is to provide a resilient support which is capable of providing vibration isolation when installed in any position or attitude. Many types of resilient supports, which have been and are in common use, are adapted to operate only when the equipment is supported upon a horizontal surface and when the isolators are located underneath the mounted equipment. The maneuvering ability of certain types of military aircraft requires that resilient supports operate properly when the mounting surface is horizontal, vertical or inclined, and when the isolators are below, above or beside the mounted equipment.

Another object of this invention is to provide a damped isolator in which the damping is effective for all directions of motion, whether such motion is in the vertical or horizontal direction. A still further object is to provide damping whose effectiveness may be adjusted at will, independently of other characteristics of the isolator, and in which the damping in the vertical and horizontal directions may be adjusted to different values if desired.

Another object of this invention is to provide a resilient support in which the spring and damping forces remain substantially unaffected when the mounted equipment experiences an appreciable displacement. In certain applications of resilient supports on equipment mounted in rockets and guided missiles, a substantially constant value of acceleration is sustained for a relatively long time. The effect of this acceleration upon the mass of the mounted equipment simulates the application of a steady force to the isolator and causes a constant deflection thereof. It is desirable that the resilient load supporting element remain operative during these conditions to afford vibration isolation and that the damper continue to function to prevent the occurrence of transient vibration.

Another object of this invention is to provide a damped vibration isolator of a design which can be constructed in a variety of sizes and shapes. Substantially the same characteristics can thus be attained, regardless of the size of the isolator and the weight of the mounted equipment.

Another object of this invention is to provide non-linear spring and damping means. A resilient support is frequently subjected to relatively severe shock which tends to cause excessive deflection of the spring. A non-linear resilient means progressively builds up resistance to such deflection, and avoids the excessively large forces derived from abrupt bottoming. A non-linear damping means also tends to prevent excessively large amplitudes during resonant conditions.

Another object of this invention is to incorporate the vibration isolators as components of a base comprising isolators and associated structure for attachment to both the mounted equipment and the aircraft structure. Such a construction eliminates possible errors in alignment of component parts which may result during installation. It also makes possible the construction of a relatively rigid structure by the employment of integral stiffening means.

A further object of the invention is to arrange the isolator components as parts of an integrally formed base which is designed to conform to the particular requirements of the mounted equipment. This makes it possible to position the component parts of the base so as to conserve space, without being restricted by the conventionalities of individual isolators.

A further object of this invention is to employ a type of construction which makes possible the use of different spring stiffnesses and clearances along the three coordinate axes when indicated by the requirements of particular applications. Resilient supports of the type described herein are used frequently in guided missiles which sometimes experience a large take-off acceleration along the axis of travel of the missile. This requires special control of stiffnesses along such axis, together with the provision of adequate clearances.

A still further object is to provide a simple and efficient resilient support which is economical to manufacture.

Other objects and advantages of the invention will be apparent to persons skilled in the art from the following description and the accompanying drawings in which:

Figure 1 is a partially broken away plan view showing one embodiment of this invention;

Figure 2 is a section taken on line 2—2 of Figure 1;

Figure 3 is a sectional view taken on line 3—3 of Figure 1;

Figure 4 is a schematic view similar to Figure 1 showing a modified form of this invention, taken on line 4—4 of Figure 5;

Figure 5 is a view similar to Figure 2 but showing the embodiment illustrated in Figure 4, taken on line 5—5 of Figure 4;

Figure 6 is a schematic view similar to Figure 1, illustrating still another embodiment of this invention;

Figure 7 is a sectional view taken on line 7—7 of Figure 6;

Figure 8 is an enlarged view of a portion of Figure 7;

Figure 9:
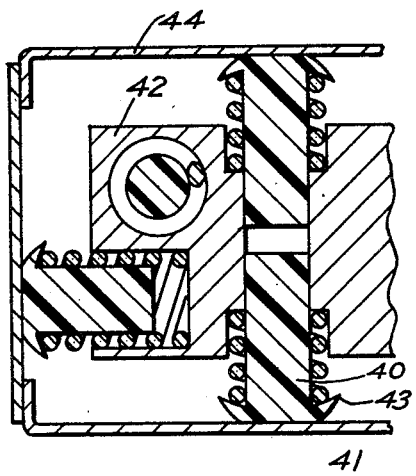
Figure 9 is an enlarged view similar to a portion of Figure 3, showing another embodiment of this invention.

In the embodiment illustrated in Figures 1 to 3, the mounted body 1 is attached by the flanges 1a and securing means 1b to supported members 2 extending along opposite sides thereof. The supporting member 3 comprises spaced enclosures each having a bottom wall 4, and vertical walls 5 and 5a arranged along three sides of the bottom wall 4, and inwardly extending, substantially horizontal flange walls 6 on the upper edges of the vertical walls. Springs 7, 8, 9 and 11 are arranged between the supporting member 3 and the supported member 2 as illustrated in the drawings. When the mounted body 1 is moved vertically downward, its movement is resisted by the springs 7. When the mounted body is moved upward, its movement is resisted by the springs 8. When the mounted body is moved toward the right, as viewed in Figures 1 and 2, its movement is resisted by the springs 9; and for movement to the left, the resistance is provided by springs opposite to springs 9 and similar thereto. When the mounted body is moved away from the paper, as seen in Figure 2, the resistance is provided by the springs 11 and when the supported body is moved in the opposite direction, i.e., toward the paper, as seen in Figure 2, the resistance is provided by springs opposite and similar to springs 11.

Vibration isolation is attained by supporting the mounted body on springs or other reslient means. A body supported by springs has one or more natural frequencies which are determined by the weight of the equipment, its weight distribution, and the stiffnesses and positions of the springs. If vibration of a given frequency is to be isolated, it is necessary that the springs be designed so that the natural frequency of the body on its springs is less than the frequency of the vibration to be isolated. An equipment supported by springs has natural modes of vibration in the several directions, and the same principles of vibration isolation apply for motion in each direction. It may be desirable to employ different springs acting in different directions to achieve the desired control of the natural frequencies in the several directions. When a natural frequency and the frequency of the vibration become equal, a condition of resonance occurs and relatively large vibration amplitudes may develop. This is prevented by dissipation of energy which is achieved by introducing a damping force. A damping force is one which opposes, without energy storage, any prescribed motion. A friction force is an example of a damping force and is employed to prevent resonant conditions in one embodiment of this invention.

The means for providing the damping are best illustrated by the broken away and cross sectional portions of Figures 1 to 3. The damper associated with spring 8, for example, consists of an element 13 whose diameter is slightly smaller than the inside diameter of the spring. The inner end of the element 13 slides snugly in the spring to prevent radial movement of the damper; the outer end of the damper has an enlarged portion 14 which is interposed between the spring 8 and the flange wall 6 of the supporting member 3. Consider now that the mounted body 1 moves toward the right, as seen in Figures 1 and 2. This movement is resisted by the coil spring 9 and the damper 13 slides upon the flange wall 6 of the supporting member 3. The damper is urged against the flange wall 6 by the spring 8, the lower end of which is mounted in the recess 8a in the member 2, and the energy dissipated in sliding provides the damping required to prevent excessive vibration. Additional damping for motion in the rightward direction is provided by the dampers 15 illustrated in Figure 2 and 15a illustrated in Figure 1. The force which urges the damper 15 against the bottom wall 4 is provided by the spring 7 seated in the recess 7a and the force which urges the damper 15a against the vertical wall 5a is provided by the coil spring 11 seated in the cavity 11a. These springs 7 and 11 serve the additional function of elastically resisting downward and forward movements of the mounted body respectively. The stiffness of a linear spring does not change as the spring is deflected. It is thus possible, by designating the initial compression of springs 7 and 11 to control the damping force without modifying the spring stiffness.

The arrangement illustrated in Figures 4 and 5 is similar to that described in Figures 1 to 3. In the embodiment illustrated in Figures 4 and 5, a pair of supporting members 16 are provided, each having an opening 17. Each supporting member 16 encloses a supported member 18 connected to the mounted body 18a by struts 19. Each of the assemblies of supported and supporting members thus has an adequate number of springs for resisting motion in each of six directions without assistance from the assembly of members on the opposite side. This contrasts with the embodiment shown in Figures 1 to 3 wherein rightward motion is resisted by spring 9 and leftward motion by a similarly disposed spring on the opposite side of the mounted body.

Figure 7A:
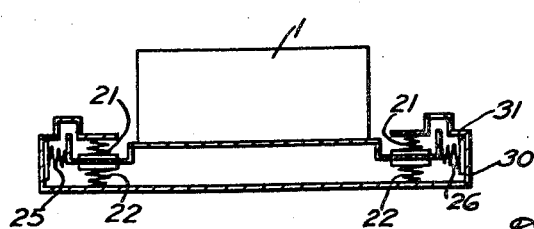
Figure 7a is a section view taken on line 7a—7a of Figure 6.

The arrangement shown in Figures 6 and 7 is similar to that shown in Figures 1 to 3 in that a single supporting member 20 and a single supported member 20a are employed. In this instance, upward movement of the mounted body 1 is resisted by the springs 21 whereas downward movement of the mounted body is resisted by the springs 22. In the same manner, rightward movement is resisted by springs 23, leftward movement by springs 24, movement into the paper, as seen in Figure 7, by springs 25, and movement away from the paper by springs 26. The detailed arrangement of these springs differs somewhat from that previously described, and produces a different result as described in detail below.

The spring detail is shown in the enlarged view, Figure 8. The supported member 20a associated with the mounted body 1 has a horizontally extending flange 27 and a flange 28 extending vertically from the outer edge of flange 27. The supporting member 20 comprises spaced enclosures on opposite sides of the mounted body 1, each having a bottom wall 29, a peripherally extending vertical wall 30 and an inwardly extending flange wall 31 on the upper edge of the vertical wall 30. The spring 21, for example, is conical in shape, and its small or upper end is located by the embossment 32 attached to the flange wall 31 and entering the small end of the conical spring 21. The lower or large end of the conical spring 21 rests within a cut-shaped damping element 33 which is not secured to any member but is held in its interposed position between spring 21 and flange 27 by the force exerted by the spring. If the mounted body 1 moves rightward looking at Figs. 6, 7 and 8, for example, its motion is resisted by spring 23. During the first small increment of rightward movement, the cup-shaped damping element 33 accompanies the flange 27 because of the friction between the flange 27 and the damping element 33. The spring 21 had a horizontal stiffness, however, and the force tending to hold the damping element 33 stationary increases as the movement of the supported body 1 toward the right continues. Eventually this spring force overpowers the friction force, and then sliding occurs between the damping element 33 and the flange 27. Sliding occurs between flange 27 and damping element 33 only when the displacement of the mounted body 1 becomes relatively great. As a consequence, the vibration tends to be relatively undamped when its vibration amplitude is small because no sliding occurs. When the vibration amplitude increases sufficiently, the damping element 33 slides upon the flange 27 and dissipates energy from the system, thereby tending to reduce the vibration amplitude. It can be seen from a study of the spring arrangement that each spring provides a resistance to movement in a direction along the spring axis, and provides the force for friction damping along each of two other axes.

Under conditions of severe shock, an isolator tends to experience a large deflection. To prevent hard bottoming at the limit of deflection, it is common practice to provide a resilient limiting device. The various embodiments illustrated in the accompanying drawings may be designed to provide the desired cushioning means. In Figure 8, the damping elements 33, 33a and 33b are provided with convex central parts for engagement with the embossments 32, 32a and 32b upon extreme travel. Each damping element may be made from a material such as nylon which has a relatively low modulus of elasticity and therefore may be deflected a substantial distance when engaged by an embossment.

Another means for accomplishing the same objective is shown in Figure 9. This arrangement is generally similar to that illustrated in Figure 3. In this embodiment, the damping element 40 is provided with a convex surface 41 on the enlarged end 43 thereof. The periphery of the enlarged end 43 is curved inwardly toward the supported member 42. Upon excessive movement of the supported member 42 toward the supporting member 44, the periphery 43 engages the supported member 42 to limit such movement. The damping element 40 is preferably made from relatively resilient material such as nylon and a cushioned impact thus results.

Figure 10:
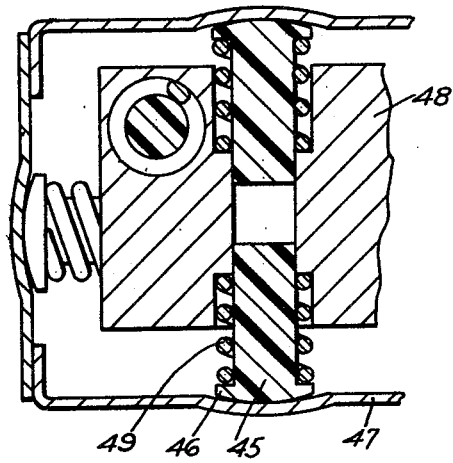
Figure 10 is another enlarged view similar to a portion of Figure 3, showing another embodiment of this invention.

Another refinement which can be embodied in arrangements of the type described herein is control of the damping force. In the arrangement shown in Figure 10, the damping element 45 is provided with a convex outer end which rests within the concave seat 46 provided on the inner surface of the supporting member 47. When the supported member 48 moves horizontally, the damping force provided by the friction between the damping element 45 and supporting member 47 is small initially. As horizontal motion of the supported member 48 continues, however, the damping element 45 is forced further into the cavity in the supported member 48 by the concave impression in the supporting member 47. This increases the compression of the spring 49 and consequently increases the pressure between damping element 45 and supporting member 47. This brings about an increase in damping force and introduces a type of non-linearity in which the damping force increases as the deflection increases. The tendency of the damping element 45 to center itself in in the concave seat 46 is a spring-like effect and it is possible under some circumstances to eliminate the springs acting parallel to the member 47.

Figure 11:
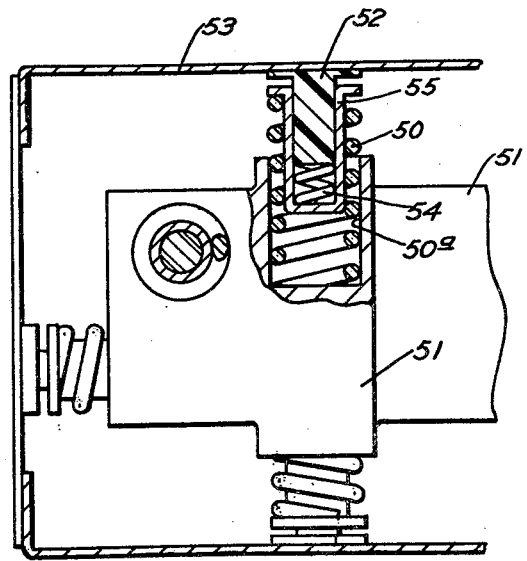
Figure 11 is another enlarged view similar to a portion of Figure 3, showing a still further embodiment of this invention.

A somewhat different means for controlling the damping force is illustrated in Figure 11. This method is used when the main load-carrying spring 50 must be relatively stiff to limit the deflection during shock. If this relatively stiff spring were deflected initially a sufficient distance to insure that the load on the spring is not relieved upon maximum downward movement of the supported member 51, it would be found that the force urging the damping element 52 against the supporting member 53 would be excessive. This difficulty is avoided by providing but relatively little initial deflection of the main spring 50, and providing an auxiliary spring 54 interposed between the damping element 52 and a housing 55 which slides snugly in the main load-carrying spring 50 which in turn slides in the cavity 50a in the supported member 51. The stiffness and deflection of the auxiliary spring 54 may thus be adjusted to provide optimum force between damping element 52 and supporting member 53. The main load-carrying spring 50 may at the same time be designed to provide optimum isolation of vibration and shock without introducing the requirement that it also have optimum stiffness for providing the desired damping.

Although several embodiments of the invention have been shown and described, it is to be understood that this disclosure is for the purpose of illustration only and that various changes and modifications may be made without departing from the spirit and scope of the invention as set forth in the appended claims.

We claim:
1. A resilient support adapted for use with a mounted body to afford vibration isolation comprising supporting and supported members, means for attaching said supported member to the mounted body, one of said members including a pair of spaced walls, the other of said members having a portion interposed between said walls in spaced relation thereto, resilient means interposed between said last-mentioned member and the walls of said first-mentioned member, means for constraining said resilient means to move substantially with one of said members for motion substantially parallel to said walls, and friction damping elements interposed between said resilient means and the other of said members, at least one of said damping elements comprising two parts with a spring interposed therebetween arranged to yieldingly urge said parts against the wall and said resilient means.

2. A resilient support adapted for use with a mounted body to afford vibration isolation comprising supporting and supported members, means for attaching said supported member to the mounted body, one of said members including a pair of spaced walls, the other of said members having a portion interposed between said walls in spaced relation thereto, resilient means interposed between said last-mentioned member and the walls of said first-mentioned member, means for constraining said resilient means to move substantially with the last-mentioned member for motion parallel to said walls, and friction damping elements interposed between said resilient means and said walls, each of said damping elements comprising two parts with a spring interposed therebetween arranged to yieldingly urge said parts against said walls and said resilient means, said spring having a relatively low stiffness compared to said resilient means.

3. A resilient support adapted for use with a mounted body to afford vibration isolation comprising supporting and supported members, means for attaching said supported member to the mounted body, one of said members having walls extending over and under and in spaced relation with opposite end portions of the other member and having a pair of end walls and a pair of side walls, said other member being at least in part interposed between and in spaced relation with said end walls and between and in spaced relation with said pair of side walls, said side walls extending substantially perpendicular to said end walls, coil springs interposed between said opposite end portions and said walls extending over said opposite end portions, between said opposite end portions and said walls extending under said opposite end portions, between said other member and said pair of end walls and between said other member and said pair of side walls, means for constraining one end of each of said coil springs against substantial sliding movement with respect to the member with which said end is associated in a direction substantially perpendicular to the line of action of said spring and friction damping means interposed between the other end of each of said coil springs and the portion of the member with which said other end is associated.

4. A resilient support according to claim 3, said means for constraining said one end of said coil spring comprising a cavity in the member with which said one end of said spring is associated and in which said end is disposed.

5. A resilient support adapted for use with a mounted body to afford vibration isolation comprising supporting and supported members, means for attaching said supported member to a mounted body, one of said members including a wall, the other of said members having a portion spaced from and movable toward and away from and in a direction generally parallel to said wall, first resilient means interposed between said portion of said last mentioned member and said wall of said first mentioned member, a friction damping element interposed between said first resilient means and said wall, means for constraining said damping element to move substantially with said last mentioned member and with respect to said wall in said direction generally parallel to said wall, said damping element comprising at least two parts with second resilient means interposed therebetween arranged to yieldingly urge said parts against said wall and said first resilient means.

6. A support according to claim 5, said first resilient means being constrained to move with said last mentioned member and with respect to said wall in said direction generally parallel to said wall, said second resilient means yieldingly urging one part of said damping element against said wall and the other part in an opposite direction against said first resilient means.

7. A support according to claim 5, said second resilient means having a lower stiffness than said first resilient means.

References Cited in the file of this patent

UNITED STATES PATENTS

| | | |
|---|---|---|
| 804,884 | Rutal | Nov. 21, 1905 |
| 2,688,479 | Barbera | Sept. 7, 1954 |
| 2,762,678 | Moore | Sept. 11, 1956 |